United States Patent [19]

Burton

[11] Patent Number: 4,735,276
[45] Date of Patent: Apr. 5, 1988

[54] APPARATUS FOR FRONT SUSPENSION OF MOTORCYCLE

[76] Inventor: John E. Burton, 7749-F Nordica Ave., Niles, Ill. 60648

[21] Appl. No.: 946,313

[22] Filed: Dec. 23, 1986

Related U.S. Application Data

[63] Continuation-in-part of Ser. No. 768,200, Aug. 22, 1985, abandoned.

[51] Int. Cl.$^4$ ............................................. B62K 25/08
[52] U.S. Cl. .................................... 180/219; 280/276; 280/279; 280/703
[58] Field of Search ............... 280/276, 279, 277, 284, 280/287, 714, 703; 180/219

[56] References Cited

U.S. PATENT DOCUMENTS

| | | | |
|---|---|---|---|
| 4,572,534 | 2/1986 | Heyl | 280/276 |
| 4,582,343 | 4/1986 | Waugh | 280/284 |
| 4,609,202 | 9/1986 | Miyakoshi et al. | 280/276 |

Primary Examiner—John J. Love
Assistant Examiner—Donn McGiehan
Attorney, Agent, or Firm—Marshall, O'Toole, Gerstein, Murray & Bicknell

[57] ABSTRACT

This disclosure relates to apparatus for use with a motorcycle including a frame, a front wheel and a suspension system connecting the front wheel with the frame, the suspension system including a fork slider, a fork tube which is movable within the slider, and a force device for urging the slider and the tube apart. The apparatus comprises first device adapted to be connected to the slider, second device adapted to be connected to the tube, latch apparatus for engaging the first and second devices, and releasable force means for moving the first and second devices together and thereby moving said suspension system to a lowered position during acceleration of the motorcycle. A control is provided for disabling the apparatus and enabling the motorcycle to operate in its normal level after the period of acceleration has passed.

21 Claims, 2 Drawing Sheets

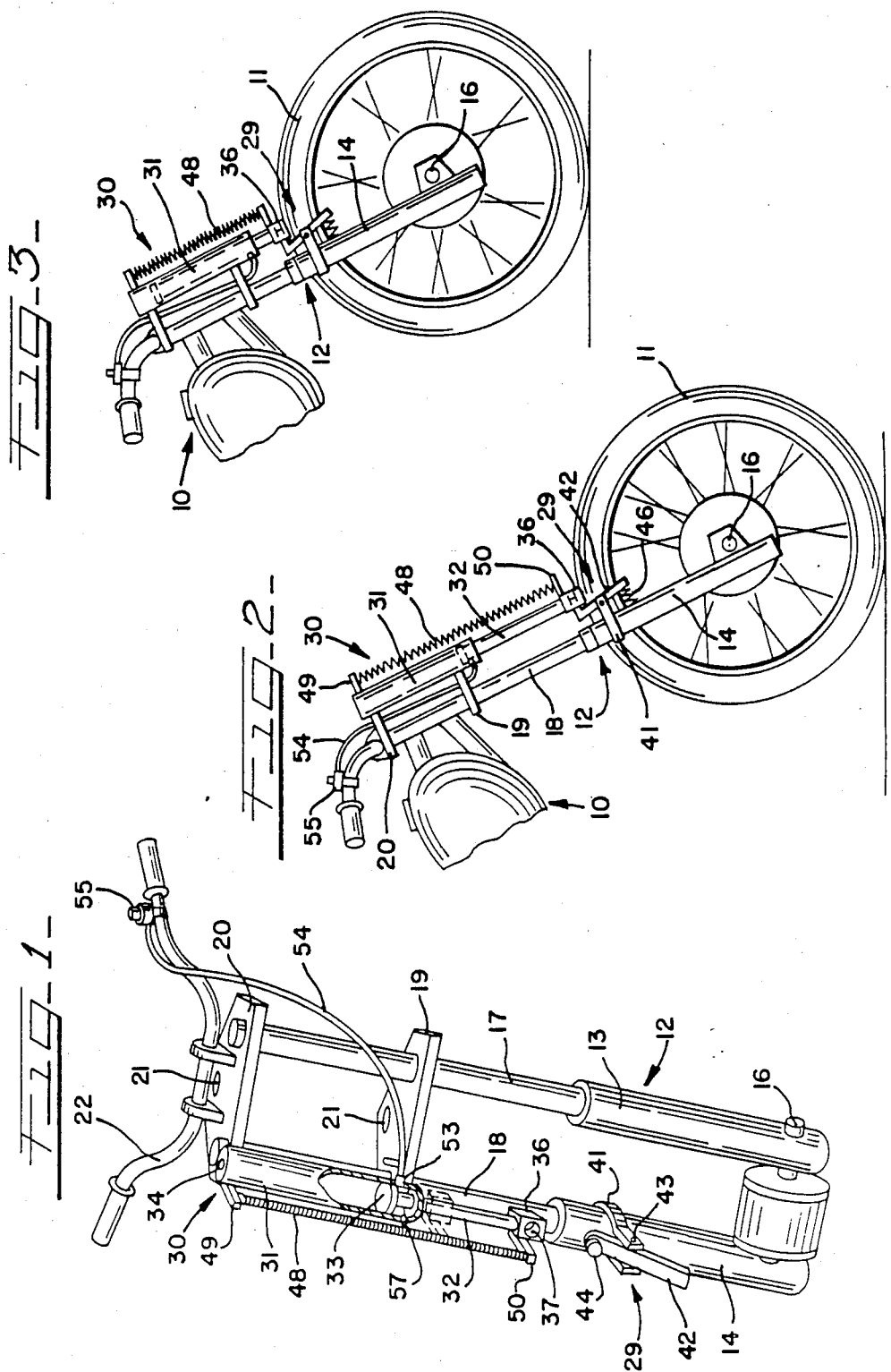

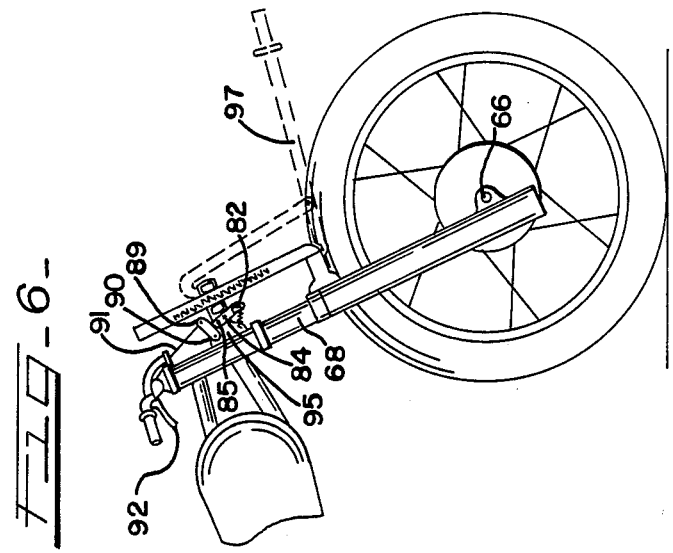
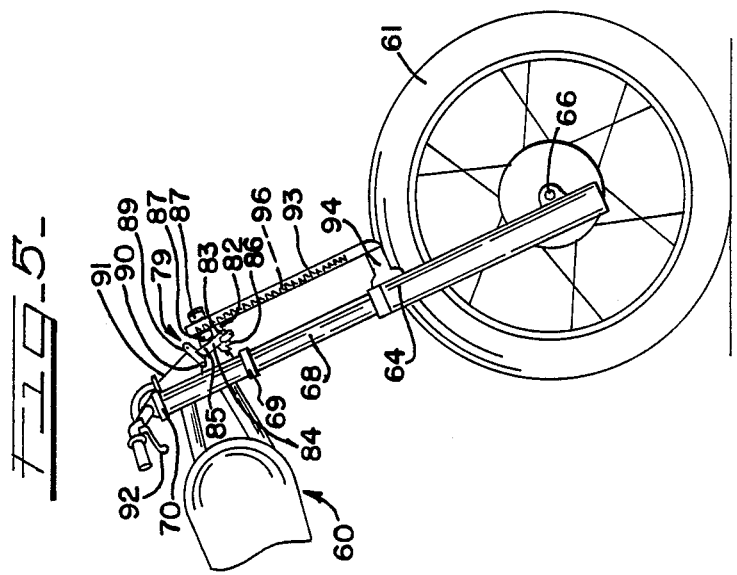
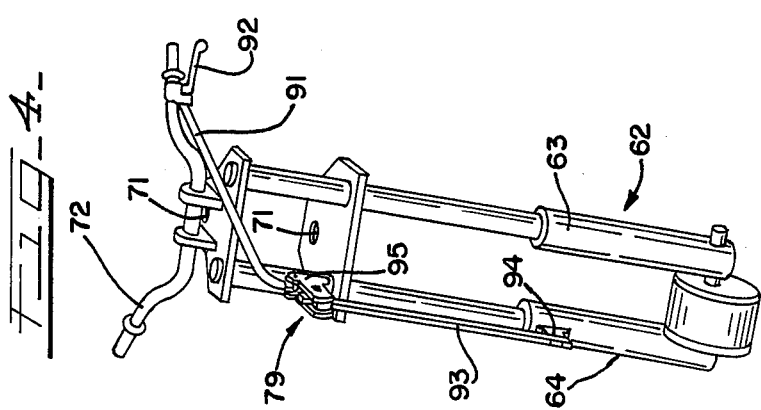

APPARATUS FOR FRONT SUSPENSION OF MOTORCYCLE

Related Applications

This is a continuation-in-part application of Ser. No. 768,200, filed on Aug. 22, 1985 by John E. Burton, now abandoned.

Field and Background of the Invention

Motorcycles designed for racing on unpaved ground typically use a suspension system between the main frame and the wheels to absorb the jolting encountered while traveling on rough terrain. These motorcycles are commonly called "off-road motorcycles". There have been several designs of suspension systems in the past; the most common for the front wheel, for which this invention is primarily concerned, is the telescopic front fork suspension system. This system consists of a front wheel axially connected to two fork tube sliders, one on each side of the wheel. Each fork tube slider is connected concentrically around a fork tube and is allowed to traverse along its length. The fork tube sliders are extended along the fork tube by an internal compression spring, and traverse motion is dampened hydraulically. The fork tubes are clamped together and pivotably connected to the main frame of the motorcycle and also control steering movement of the front wheel.

Off-road motorcycles used in racing events (such as the motocross) are equipped with long travel suspension systems that can absorb large impacts and as a result, the motorcycle has a high center of gravity and tall seat height. This construction, however, creates a problem when trying to achieve fast forward acceleration as during the start of a motocross race. The problem is the occurrence of a "wheelie", which causes loss of steering and possible overturn. A wheelie is the event in which a motorcycle's front wheel becomes airborne during rapid forward acceleration.

There are two opposing moments that determine whether a motorcycle and its rider will wheelie. The first moment is created by the engine's torque, which turns the rear wheel relative to the motorcycle's main frame, or in the case of a wheelie, the motorcycle's main frame relative to the rear wheel. The other moment resists the wheelie and is created by the total weight of the rider and motorcycle, acting at their combined center of gravity. This latter moment is measured by multiplying the total weight of the rider and motorcycle by the horizontal distance between the rear axle and the center of gravity.

If the rider moves farther forward on the motorcycle, the center of gravity also moves forward, making the wheelie resisting moment greater. Theoretically, less weight would rest on the rear wheel, and there would be less traction and less torque to create a wheelie.

This invention provides a solution to wheelies in that it temporarily compresses the front suspension for the start of a race. Compressing the front suspension allows a rider to sit farther forward, which changes the center of gravity. After the rider has completed the start of the race, the suspension is enabled to return to its normal height for normal operation.

SUMMARY OF THE INVENTION

Apparatus in accordance with this invention is for use with a motorcycle including a frame, a front wheel and a suspension system connecting the front wheel with the frame; the suspension system includes a fork slider, a fork tube which is movable within the slider, and a force device for urging the slider and the tube apart. The apparatus comprises first means adapted to be connected to the slider, second means adapted to be connected to the tube, and latch means for engaging the first and second means.

BRIEF DESCRIPTION OF THE DRAWINGS

The invention will be better understood from the following detailed description taken in conjunction with the accompanying figures of the drawings, wherein:

FIG. 1 is a fragmentary perspective view of part of a motorcycle, including apparatus in accordance with the present invention;

FIG. 2 is a side elevational view of the front suspension of the motorcycle and the apparatus; and FIG. 3 is a view similar to FIG. 2 but showing a different position of some of the parts.

FIG. 4 is a view similar to FIG. 1 but showing an alternative form of the invention;

FIG. 5 is a view similar to FIG. 2 but showing the form of FIG. 4; and

FIG. 6 is a view similar to FIG. 3 but showing the form of FIG. 4.

DETAILED DESCRIPTION OF THE DRAWINGS

The drawings show apparatus in accordance with the invention mounted on the front suspension system of a conventional motorcycle such as, for example, the Kawasaki KX500. Such a motorcycle includes a frame 10 supported on the ground by a front wheel 11 and a rear wheel (not shown). The front wheel 11 is resiliently mounted on the forward end of the frame 10 by a front suspension system 12, best shown in FIG. 1. The suspension system 12 includes two fork sliders 13 and 14, the lower ends of the two sliders 13 and 14 being secured to opposite ends of a horizontally extending axle 16 for the front wheel 11. The two fork sliders 13 and 14 slant upwardly and rearwardly from the axle 16, and two fork tubes 17 and 18 are telescopically received within the two sliders 13 and 14. The two fork tubes 17 and 18 are secured to two triple clamps 19 and 20 which are also fastened to the forward end of the frame 10 as shown in FIGS. 2 and 3. Openings 21 are formed in the two triple clamps 19 and 20 so that the forward end of the frame 10 may be rotatably mounted or fastened to the two triple clamps, and a handle bar 22 is fastened to the upper clamp 20. The front suspension system 12 further includes compression springs (not shown) mounted within the two fork sliders for urging the tubes 17 and 18 upwardly from the sliders 13 and 14.

Apparatus in accordance with this invention comprises a pneumatic mechanism 30 attached to the upper part of the front suspension and a latch mechanism 29 attached to the fork slider 14. The pneumatic mechanism 30 may be secured to the triple clamps 19 and 20, for example, relatively permanently as by welding, or releasable clamps (not shown) may be provided for this purpose. The pneumatic mechanism 30 includes a cylinder 31 which is secured to the clamps 19 and 20, a piston rod 32 that extends downwardly out of the lower end of the cylinder 31, and a piston 33 which is secured to the upper end of the rod 32 and slidingly moves within the cylinder 31. A breather hole 34 is preferably provided in the upper end of the cylinder 31 to allow movement of air into and out of the cylinder 31 above the piston 33. A latch head 36 is secured to the lower end of the piston rod 32 and a hole or opening 37 is formed in the head 36.

The latch mechanism 29 includes a band or strap 41 which is fixedly secured to the fork slider 14. A pivot latch 42 is pivotally connected by a pin 43 to the strap 41, and a latch pin 44 is formed on the upper end of the latch 42. Further, a compression latch spring 46 is located between the lower end of the latch 42 and the fork slider 14 and normally urges the latch 42 to pivot in the counterclockwise direction as seen in FIGS. 2 and 3. The strap 41 and the pin 44 are positioned so that the pin 44 may be extended into the opening 37 of the head 36, as shown in FIGS. 2 and 3.

In addition, the apparatus comprises a retrieving spring 48 which is connected between two fingers 49 and 50. The finger 49 is attached to the pneumatic cylinder 31 and the finger 50 is attached to the head 36. The retrieving spring 48 is a tension spring and it normally urges the piston rod 32 and the head 36 upwardly in order to retract the rod 32 into the cylinder 31.

The pneumatic system further includes a pneumatic valve 53 on the side of the cylinder 31 adjacent the lower end thereof, at a location where it is below the piston 33. The valve 53 is connected by a cable 54 to a switch 55 mounted on the handle bars 22. When the switch 55 is manually operated by the rider of the motorcycle, it opens the valve 53 and connects the lower end of the cylinder 31 to the atmosphere. In addition, the pneumatic mechanism includes a valve 57 mounted on the cylinder 31 at the lower end thereof, below the piston 33. The valve 57 may be used by the operator to connect a source of air pressure to the pneumatic cylinder 31 below the piston 33.

In the operation of the motorcycle and the apparatus in accordance with the invention, assume that the front suspension of the motorcycle is in the position illustrated in FIG. 1 and that the head 36 on the piston rod is moved upwardly to the dashed line position. In this location of the parts, the piston 33 is retracted entirely to the upper end of the cylinder 31 by the retrieving spring 48. Further, the compression springs within the fork sliders 13 and 14 urge the two fork tubes 17 and 18 upwardly and therefore the front end of the frame is in the normal or raised position illustrated in FIGS. 1 and 2.

To prepare the motorcycle for a race, it is desirable to lower the front end of the frame as previously explained. In certain types of races, it is customary for the rider to start the motorcycle with what is called a "full throttle start", wherein the engine is brought to the full throttle operating position and then the clutch is engaged. This, of course, produces rapid acceleration with the resultant possibility of the front wheel lifting from the ground. As previously explained, the function of the apparatus in accordance with this invention is to lower the forward end of the frame to enable the operator to lean forwardly and downwardly and to maintain the front wheel on the ground during this rapid acceleration. This is attained by, before the race, pulling the rod 32 and the head 36 downwardly against the force of the spring 48, and engaging the opening 37 of the head 36 with the pin 44 (see FIG. 2). Then the piston rod 32 is moved up into the cylinder 31 in order to move the piston 33 to the position where it is adjacent the upper end of the cylinder 31, as illustrated in FIG. 3. The last step may be accomplished by closing the valve 53 and connecting a source of high pressure air to the valve 57 after the pin 44 has been placed in the opening 37. The high pressure in the lower end of the cylinder 31 below the piston 33 forces the piston upwardly to the fully retracted position shown in FIG. 3. When the high pressure air is removed from the valve 57 (which then closes), the high pressure air in the lower end of the cylinder 31 is trapped and holds the piston rod 32 in the retracted position. Since the latch mechanism 29 holds the fork slider 14 in coupled relation with the piston rod 32 and the cylinder 31, the forward end of the motorcycle frame is thereby held in the lowered position illustrated in FIG. 3. The operator of the motorcycle is thereby able to start the race with the forward end of the motorcycle frame lowered in order to obtain the beneficial results previously described.

After the rider has brought the motorcycle up to substantially full racing speed and the period of rapid acceleration has terminated, it is desirable to have the forward end of the frame in the normal or raised position shown in FIG. 2 because this position is more beneficial during this part of the race. Consequently the operator actuates the switch 55 and thereby opens the valve 53, releasing the air pressure within the lower end of the cylinder 31. The compression springs within the fork sliders 13 and 14 are then able to move the fork tubes 17 and 18 upwardly and the mechanisms assume the position shown in FIG. 2. The frictional engagement between the pin 44 and the side of the opening 37 normally holds the pin in the opening 37, but once the tension on the parts is released by the absence of air pressure in the cylinder 31, the latch spring 46 pivots the latch 42 in the counterclockwise position and disengages the pin 44 from the head 36. This position of the parts is illustrated in solid lines in FIG. 1, and after disengagement of the pin 44 from the head 36, the retrieving spring 48 moves the piston rod 32 and the head 36 upwardly to the dashed line position where it is out of the way and will not bump into the latch during normal operation of the front suspension. The parts will then remain in the raised position until the termination of the race, and the parts may later be returned to the lowered positions for the start of a subsequent race.

As a specific example of apparatus in accordance with the present invention, the pneumatic mechanism 30 may include a cylinder having a 1.5 inch bore and a 10 inch stroke. Compressed air pressure below the piston of in the neighborhood of 135 psi will produce approximately 210 lbs. of force on the piston 33. The retrieving spring 48 may have, for example, 8 lbs. of tensile force. Apparatus having the foregoing specifications are suitable for use with a front suspension having an 11 inch total travel and a spring constant of 18 lbs. per inch. Air pressure for connection to the valve 57 may be obtained from a bicycle tire pump or from a portable tank of compressed air.

FIGS. 4 to 6 show apparatus in accordance with an alternative embodiment of the invention also mounted on the front suspension system of a conventional motorcycle such as, for example, the Kawasaki KX500. Again, the motorcycle includes a frame 60 supported on the ground by a front wheel 61 and a rear wheel (not shown). The front wheel 61 is resiliently mounted on the forward end of the frame 60 by a front suspension system 62, best shown in FIG. 4. The suspension system 62 includes two fork sliders 63 and 64, the lower ends of the two sliders 63 and 64 being secured to opposite ends of a horizontally extending axle 66 for the front wheel 61. The two fork sliders 63 and 64 slant upwardly and rearwardly from the axle 66, and two fork tubes 67 and 68 are telescopically received within the two sliders 63 and 64. The two fork tubes 67 and 68 are secured to two triple clamps 69 and 70 which are also fastened to the forward end of the frame 60 as shown in FIGS. 5 and 6. Openings 71 are formed in the two triple clamps 69 and 70 so that the forward end of the frame 60 may be rotatably mounted or fastened to the two triple clamps, and a handle bar 72 is fastened to the upper clamp 70. The front suspension system 62 further includes compression springs (not shown) mounted within the two fork sliders for urging the tubes 67 and 68 upwardly from the sliders 63 and 64.

Apparatus in accordance with this form of the invention comprises a stem 93 attached to the fork slider 64 and a latch mechanism 79 attached to the upper part of the front suspension. The stem 93 may be secured to fork slider 64, for example, with the use of a bracket 94, fasteners (not shown) and releasable clamps (not shown), or more permanently by casting the bracket 94 and fork slider 64 as one piece. The latch mechanism 79 may be secured to the upper part of the suspension, for example, with the use of a bracket 95 and releasable clamps. The stem includes impressions or notches 96 along its side or edge which is adjacent the mechanism 79, and located to be engageable with the latch mechanism 79.

The latch mechanism 79 includes an arm 85 pivotally connected by pin 84 to the bracket 95. A pivot latch 82 is pivotally connected by a pin 83 to the arm 85. Further, a tension latch spring 86 is located between the lower end of the latch 82 and the lower end of the bracket 95 and normally urges the arm 85 to pivot in the clockwise direction and the latch 82 to resist pivoting in the counterclockwise direction as seen in FIGS. 5 and 6. The arm 85 and the latch 82 are positioned so that the latch 82 may be extended into the impressions 96 of the stem 93, as shown in FIGS. 5 and 6.

The latch mechanism further includes a catch 89 pivotally connected by pin 90 to the bracket 95. The catch 89 is connected by a cable 91 to a lever 92 mounted on the handle bars 72. When the lever 92 is manually operated by the rider of the motorcycle, it pivots catch 89 counterclockwise, disengaging arm 85. The tension spring 86 then pivots arm 85 clockwise disengaging latch 82 from the impressions 96 in the stem 93. Guides 87 are engageable with opposite sides of the stem 93 and add support to stem 93.

In the operation of the motorcycle and the apparatus in accordance with the invention, assume that the front suspension of the motorcycle is in the position illustrated in FIG. 4 and that the latch 82 is disengaged with impressions 96 in the stem 93. In this location of the parts, the compression springs within the fork sliders 63 and 64 urge the two fork tubes 67 and 68 upwardly and therefore the front of the frame is in the normal or raised position illustrated in FIGS. 4 and 5.

To prepare the motorcyle for a race, it is desirable to lower the front end of the frame as previously explained. This is attained by, before the race, pushing the forward end of the frame downwardly in order to retract the fork tubes 67 and 68 into the fork sliders 63 and 64 as illustrated in FIG. 6. The foregoing may be accomplished by rotating arm 85 counterclockwise until it engages with catch 89 and compressing the front suspension system 62 so that the fork tubes 67 and 68 slide down into the fork sliders 63 and 64 and the stem 93 slides up through the guides 87 in the catch mechanism 79. Compressing the front suspension system 62 can be accomplished by pressing downwardly on the handlebar 72 and/or using a leverage bar 97 as depicted in dotted lines in FIG. 6. The latch 82 will pivot counterclockwise over the impressions 96 in the stem 93 as it slides up through the guides 87, similar to the operation of a ratchet. The arm 85 limits clockwise rotation of latch 82 so that it engages with the impressions 96 and prevents the stem 93 from sliding downwardly through the guides 87. The forward end of the motorcycle frame is thereby held in the lowered position illustrated in FIG. 6. The operator of the motorcycle is thereby able to start the race with the forward end of the motorcycle frame lowered in order to obtain the beneficial results previously described.

After the rider has brought the motorcycle up to substantially full racing speed and the period of rapid acceleration has terminated, it is desirable to have the forward end of the frame in the normal or raised position shown in FIG. 5 because this position is more beneficial during this part of the race. Consequently the operator actuates the lever 92 and thereby disengages arm 85. Both the front suspension systems 12 compression spring force acting on the stem 93 and the tension spring 86 cause the arm 85 to rotate clockwise and disengage the latch 82 from the impressions 96 in the stem 93. The compression springs within the fork sliders 63 and 64 are then able to move the fork tubes 67 and 68 upwardly and the suspension system assumes the position shown in FIG. 4. The hydraulic dampening in the front suspension system 12 prevents an abrupt return to the raised position. After the arm 85 has been disengaged with the catch 89, the tension spring 86 holds the latch 82 disengaged with the stem 93. This allows the stem 93 to slide freely through the guides and not interfere with the normal operation of the front suspension system 62 for the remainder of the race. The latch mechanism may later be reset and returned to the lowered positions for the start of a subsequent race.

It will be apparent that a novel and useful apparatus in accordance with the present invention has been provided. The mechanism enables an operator to hold the front end of a motorcycle frame down during the start of the race, and to easily release the mechanism during the progress of the race to the normal position. The mechanism may be readily attached to standard construction motorcycles and therefore could be provided as a kit which may be purchased by a motorcycle operator and mounted on his bike. It could also, of course, be provided as original equipment on a motorcycle.

While the preferred embodiment of the invention includes a stem mounted on the fork slider and a latch mechanism mounted on the upper part of the suspension as described, it should be apparent that other arrangements and modifications of the described parts may instead be provided for holding the front end of the motorcycle in the lowered position and releasing it during operation of the motorcycle. For example, the latch mechanism may be mounted to the fork slider and the stem to the upper part of the suspension.

I claim as my invention:

1. Apparatus for use by an operator of a motorcycle including a frame, rear and front wheels, a front resilient suspension connecting the frame to the front wheel, the front suspension including a first part connected to the front wheel and a second part connected to the forward end of the frame, the first and second parts being resiliently connected together and movable between a lowered position and a raised position, said appartus functioning separately from but attachable to said front resilient suspension and comprising:
(a) first means attachable to said first part of the suspension;
(b) second means attached to said second part of the suspension;
(c) one of said first and second means including adjustable releasable force means for holding said first and second parts in various positions between said raised position and said lowered position, and operator controlled means for releasing said parts for movement to the raised position.

2. Apparatus according to claim 1, wherein said force means comprises a pneumatic cylinder and piston rod, the other of said first and second means comprisng a latch releasably connectable to said piston rod.

3. Apparatus according to claim 1, wherein said force means is connected to said second part and comprises a pneumatic cylinder attachable to said second part and a piston rod slidable in said cylinder, said first means comprising a latch adapted to be attached to said first part, said latch being engageable with said piston rod.

4. Apparatus for use by an operator of a motorcycle including a frame, rear and front wheels, a front resilient suspension connecting the frame to the front wheel, the front suspension including a first part connected to the front wheel and a second part connected to the forward end of the frame, the first and second parts being resiliently connected together and movable between a lowered position and a raised position, said apparatus comprising:
(a) first means attachable to said first part of the suspension;
(b) second menas attached to said second part of the suspension;
(c) one of said first and second means including releasable force means for holding said first and second parts in said lowered position, and operator controlled means for releasing said parts for movement to the raised position, said force means being connected to said second part and comprising a pneumatic cylinder attachable to said second part and a piston rod slidable in said cylinder, said first means comprising a latch adapted to be attached to said first part, said latch being engageable with said piston rod, said cylinder including air intake valve means for receiving pressurized air, and air release valve means for releasing the pressurized air.

5. Apparatus according to claim 4, wherein said release valve means includes a control switch adapted to be mounted on the handle bar of the motorcycle.

6. A motorcycle for use by an operator, comprising a frame, rear and front wheels, a front resilient suspension system connecting said frame to the front wheel, said front suspension system including a first part connected to the front wheel and a second part connected to the forward end of the frame, said first and second parts being resiliently connected together and movable between a lowered position and a raised position, first means attached to said first part, second means attached to said second part, said first and second means functoning separately from but attached to said parts of said front suspension system, one of said first and second means including adjustable releasable force means for holding said first and second parts in various positions between said raised position and said lowered position, and operator controlled means for releasing said parts for movement to the raised position.

7. Apparatus according to claim 6, wherein said force means comprises a pneumatic cylinder and piston rod, the other of said first and second means comprising a latch releasably connectable to said piston rod.

8. Apparatus according to claim 6, wherein said force means is connected to said second part and comprises a pneumatic cylinder attachable to said second part and a piston rod slidable in said cylinder, said first means comprising a latch attached to said first part, said latch being engageable with said piston rod.

9. A motorcycle for use by an operator, comprising a frame, rear and front wheels, a front resilient suspension system connecting said frame to the fron wheel, said front suspension system including a first part connected to the front wheel and a second part connected to the forward end of the frame, said first and second parts being resiliently connected together and movable between a lowered position and a raised position, first means attached to said first part, second means attached to said second part, one of said first and second means including releasable force means for holding said first and second parts in said lowered position, and operator controlled means for releasing said parts for movement to the raised position, said force means being connected to said second part and comprising a pneumatic cylinder attachable to said second part and a piston rod slidable in said cylinder, said first means comprising a latch attached to said first part, said latch being engageable with said piston rod, said cylinder including air intake valve means for receiving pressurized air, and air release valve means for releasing the pressurized air.

10. Apparatus according to claim 9, wherein said release valve means includes a control switch mounted on the handle bar of the motorcycle.

11. Apparatus for use in a motorcycle including a frame, a front wheel, and a front suspension for mounting the frame on the front wheel, the front suspension including at least one fork slider connected to the wheel, a fork tube connected to the frame and telescopically movable in the fork slider, and a compression spring between the fork slider and the fork tube for urging the tube upwardly out of the slider, said apparatus comprising:
(a) a pneumatic cylinder adapted to be attached to said fork tube;
(b) a piston rod received in said cylinder and movable between a lowered position and a raised position;
(c) latch means adapted to be attached to said fork slider, said latch means being releasably engageable with said piston rod; and
(d) adjustable control means for releasably holding said piston rod in various positions between said raised position and said lowered position;
(e) said pneumatic cylinder and said latch means functioninq separately from but being attachable to said front suspension.

12. Apparatus for use on a motorcycle including a frame, a front wheel, and a front suspension for mounting the frame on the front wheel, the front suspension including at least one fork slider connected to the wheel, a fork tube connected to the frame and telescopically movable in the fork slider, and a compression spring between the fork slider and the fork tube for urging the tube upwardly out of the slider, said apparatus comprising:

(a) a pneumatic cylinder adapted to be attached to said fork tube;
(b) a piston rod received in said cylinder and movable between a lowered position and a raised position;
(c) latch means adapted to be attached to said fork slider, said latch means being releasably engageable with said piston rod; and
(d) control means for releasably holding said piston rod in said lowered position, said control means comprising air intake valve means on said cylinder for receiving pressurized air to move said piston rod to said lowered position, and air release valve means for releasing said pressurized air.

13. Apparatus according to claim 11, and further including retrieving spring means connected between said cylinder and said rod for urging said rod to said lowered position.

14. Apparatus for use on a motorcycle including a frame, a front wheel, and a front suspension of mounting the frame on the front wheel, the front suspension including at least one fork slider connected to the wheel, a fork tube connected to the frame and telescopically movable in the fork slider, and a compression spring between the fork slider and the fork tube for urging the tube upwardly out of the slider, said apparatus comprising:
(a) a pneumatic cylinder adapted to be attached to said fork tube;
(b) a piston rod received in said cylinder and movable between a lowered position and a raised position;
(c) latch means adapted to be attached to said fork slider, said latch means being releasably engageable with said piston rod; and
(d) control means for releasably holding said piston rod in said lowered position, said latch means comprising a latch member which is pivotable between an engaged position and a disengaged position, and a latch spring for urging said latch member to said disengaged position.

15. A motorcycle for use by an operator, comprising a frame, rear and front wheels, a front resilient suspension system connecting said frame to the front wheel, said front suspension system being a long travel type and including a first part connected to the front wheel an a second art connected to the forward end of the frame, said first and second parts being resiliently oonnected together and movable between a lowered position and a raised position, first means attached to said first part, second means attached to said second part, one of said first and second means including releasable means and the other of said first and second means including holding means selectively engageable with said releasable means, said suspension system having a first position where said forward end of the frame in a lowered position and said lowered position being selectively variable and a second position where said forward end of the frame is in a raised position, said releasable means an said holding means being adjustable and operable to hold said parts in a selected lowered position, said first and second means functioning separately from but being attached to said first and second parts.

16. Apparatus according to claim 15, wherein said releasable means is operator controlled.

17. A latch mechanism for use by an operator of a motorcycle including a frame, rear and front wheels, a front resilient suspension connecting the frame to the fromt wheel, the front resilient suspension including a first part connected to the front wheel and a second part connected to the forward end of the frame, the first and second parts being resiliently connected together and movable between a lowered position and a raised position, said lowered position be selectively variable, said apparatus comprising:
(a) first latch means adapted to be attached to said first part of the suspension;
(b) second latch means adapted to be attached to said second part of the suspensation;
(c) said first and second latch means being adjustable and engageable when said first and second parts are in a selected lowered position, and said first and second latch means holding said parts in said selected lowered position when engaged, said first and second latch means functioning separately from but being attachable to said first and second parts; and
(d) operator controlled means connected to at least one of said first and second latch means for disengaging said first and second latch means and thereby releasing said parts for movement to the raised position.

18. A motorcycle for sue by an operator, comprising a frame, rear and front wheels, a front resilient suspension system connecting said frame to the front wheel, said front suspension system being a long travel type and including a first part connected to the front wheel and a second part connected to the forward end of the frame, said first and second parts being resiliently connected together and movable to selected positions between a lowered position and a raised position, first latch means attached to said part, second latch means attached to said second part, said first and second latch means being adjustable and selectively engageable and disengageable, said latch means when engaged holding said forward end of the frame in a selected lowered position and when disengaged enabling said forward end of the frame to move to said raised position, said first and second latch means functioning separately from but being attached to said first and second parts, and operator controlled means connected to said latch means for engaging and disengaging said latch means.

19. Apparatus for use on a motorcycle including a frame, a front wheel, and a front suspension for mounting the frame on the front wheel, the front suspension including at least one fork slider connected to the wheel, a fork tube connected to the frame and telescopically movable in the fork slider, and a compression spring between the fork slider and the fork tube for urging the tube upwardly out of the slider, said apparatus comprising:
(a) a stem adapted to be attached to one of said fork slider and said fork tube;
(b) latch means adapted to be attached to be attached to the other of said fork tube and said fork slider, said stem being movable to a plurality of selected positions past said latch means and said latch means being releasably engageable with said said stem at any of said selected positions; and
(c) control means for releasably holding said stem in a position where said frame is in a selected lowered position relative to the wheel, said stem and said latch means functioning separately from said front suspension but being attachable to said front suspension.

20. Apparatus according to claim 19, wherein said stem has impressions in a side thereof, and said catch mechanism includes a movable catch operable to engage said impressions.

21. Apparatus according to claim 19, wherein said stem is adapted to be attached to said fork slider and said catch mechanism is adapted to be attached to said fork tube.

* * * * *